United States Patent
Barnett et al.

(10) Patent No.: US 12,330,115 B2
(45) Date of Patent: Jun. 17, 2025

(54) METHOD AND APPARATUS FOR IMPROVED EFFICIENCY AND FLUE GAS SCRUBBING IN A FIRED HEATER USING A CONDENSING CONVECTION SECTION

(71) Applicant: BD Energy Systems, LLC, Houston, TX (US)

(72) Inventors: Daniel Joseph Barnett, Katy, TX (US); Daniel Ryan Znidersic, Houston, TX (US)

(73) Assignee: BD Energy Systems, LLC, Houston, TX (US)

( * ) Notice: Subject to any disclaimer, the term of this patent is extended or adjusted under 35 U.S.C. 154(b) by 0 days.

(21) Appl. No.: 18/261,583

(22) PCT Filed: Jan. 14, 2022

(86) PCT No.: PCT/US2022/012460
§ 371 (c)(1),
(2) Date: Jul. 14, 2023

(87) PCT Pub. No.: WO2022/155434
PCT Pub. Date: Jul. 21, 2022

(65) Prior Publication Data
US 2024/0075425 A1   Mar. 7, 2024

Related U.S. Application Data

(60) Provisional application No. 63/137,520, filed on Jan. 14, 2021.

(51) Int. Cl.
*B01D 53/26* (2006.01)
*B01D 53/14* (2006.01)
*B01D 53/62* (2006.01)

(52) U.S. Cl.
CPC ....... *B01D 53/265* (2013.01); *B01D 53/1418* (2013.01); *B01D 53/1475* (2013.01);
(Continued)

(58) Field of Classification Search
CPC .............. B01D 53/265; B01D 53/1418; B01D 53/1475; B01D 53/62; B01D 2257/504; B01D 2258/0283
(Continued)

(56) References Cited

U.S. PATENT DOCUMENTS 4,522,157 A   6/1985   O'Sullivan et al.
4,681,603 A   7/1987   Spangler et al.
(Continued)

FOREIGN PATENT DOCUMENTS

CA   3208475 A1 * 7/2022   ......... B01D 53/1418
DE   19808146     9/1999
(Continued)

OTHER PUBLICATIONS

Ingham Alan: "Reducing the Carbon Intensity of Methanol for Use as a Transport Fuel", Johnson Matthey Technology Review, vol. 61, No. 4, Oct. 1, 2017 (Oct. 1, 2017), pp. 297.
(Continued)

*Primary Examiner* — Stephen M Gravini
(74) *Attorney, Agent, or Firm* — Daniel N. Lundeen; Lundeen & Lundeen PLLC

(57) ABSTRACT

Methods and apparatus for improved efficiency and flue gas scrubbing in a fired heater using a condensing convection section. The method preheats a hydrocarbon or hydrocarbon/water process feed stream in a coil in the convection section of a fired heater, collects condensate from the flue gas, and scrubs the flue gas with the recirculated condensate. The apparatus has a heat transfer coil disposed in the convection section, to preheat a process stream and form
(Continued)

condensate from the flue gas, and a condensate recirculation loop to collect the condensate from the convection section and scrub the flue gas with the condensate.

27 Claims, 6 Drawing Sheets

(52) U.S. Cl.
CPC ........ *B01D 53/62* (2013.01); *B01D 2257/504* (2013.01); *B01D 2258/0283* (2013.01)
(58) Field of Classification Search
USPC .............................................................. 34/90
See application file for complete search history.

(56) References Cited

U.S. PATENT DOCUMENTS

| | | | |
|---|---|---|---|
| 4,705,101 A | 11/1987 | Warner | |
| 4,732,740 A | 3/1988 | Woebcke et al. | |
| 5,264,202 A | 11/1993 | Snyder | |
| 5,787,821 A | 8/1998 | Bhat et al. | |
| 5,826,518 A | 10/1998 | Bhat et al. | |
| 6,159,395 A | 12/2000 | Early et al. | |
| 6,191,174 B1 | 2/2001 | Early et al. | |
| 6,249,989 B1 * | 6/2001 | Conochie ............... | B01J 8/0285 34/588 |
| 7,866,638 B2 * | 1/2011 | Neumann ............... | C10L 3/102 261/118 |
| 7,914,758 B2 * | 3/2011 | Murray .................. | B01D 53/02 423/220 |
| 8,137,444 B2 * | 3/2012 | Farsad ................... | B01D 53/60 95/236 |
| 8,496,908 B1 | 7/2013 | Genkin et al. | |
| 8,715,393 B2 * | 5/2014 | Wright ................... | B01D 53/04 96/111 |
| 9,181,509 B2 * | 11/2015 | Bland ...................... | C10J 3/84 |
| 9,221,027 B2 * | 12/2015 | Kuppler ................ | B01J 10/005 |
| 11,187,458 B2 * | 11/2021 | Ahrenfeldt ............. | F26B 17/20 |
| 11,732,199 B2 | 8/2023 | Oud | |
| 11,953,196 B1 * | 4/2024 | Rao .......................... | F22G 5/14 |
| 12,078,385 B2 * | 9/2024 | Martin .................... | F25B 25/00 |
| 2003/0092780 A1 | 5/2003 | Sogge et al. | |
| 2004/0034110 A1 | 2/2004 | Grobys et al. | |
| 2008/0141648 A1 | 6/2008 | Towler et al. | |
| 2008/0308769 A1 | 12/2008 | Marty et al. | |
| 2009/0117024 A1 | 5/2009 | Weedon et al. | |
| 2009/0246118 A1 | 10/2009 | Drnevich et al. | |
| 2010/0080754 A1 | 4/2010 | Fischer et al. | |
| 2010/0158776 A1 | 6/2010 | Drnevich et al. | |
| 2010/0310949 A1 | 12/2010 | Licht et al. | |
| 2011/0100214 A1 | 5/2011 | Grover | |
| 2011/0291425 A1 | 12/2011 | Juranitch | |
| 2011/0313064 A1 | 12/2011 | Panza et al. | |
| 2012/0039794 A1 | 2/2012 | Catchpole | |
| 2012/0291481 A1 | 11/2012 | Terrien et al. | |
| 2013/0097929 A1 | 4/2013 | Pham et al. | |
| 2013/0156686 A1 | 6/2013 | Vauk et al. | |
| 2020/0002166 A1 | 1/2020 | Warta et al. | |
| 2022/0219975 A1 | 7/2022 | Feinstein | |
| 2023/0271905 A1 | 8/2023 | Feinstein | |
| 2024/0075425 A1 * | 3/2024 | Barnett ................... | F23J 15/04 |
| 2024/0308847 A1 * | 9/2024 | Barnett .................. | C01B 3/384 |
| 2025/0083116 A1 * | 3/2025 | Gill ........................ | C12M 43/04 |

FOREIGN PATENT DOCUMENTS

| | | | | |
|---|---|---|---|---|
| EP | 3415587 | | 12/2018 | |
| WO | WO-03018958 | | 3/2003 | |
| WO | WO-2019238635 | | 12/2019 | |
| WO | WO-2020148378 | | 7/2020 | |
| WO | WO-2022155434 A1 * | 7/2022 | ......... B01D 53/1418 |

OTHER PUBLICATIONS

Pelligrini, Laura A.: "Design of the CO2 Removal Section for PSA Tail Gas Treatment in a Hydrogen Production Plant", Frontiers in Energy Research, Vo 8 Art 77 May 27, 2020.
Written Opinion of the ISA/KR, PCT/US2022/012460, Barnett et al., May 2, 2022.

* cited by examiner

METHOD AND APPARATUS FOR IMPROVED EFFICIENCY AND FLUE GAS SCRUBBING IN A FIRED HEATER USING A CONDENSING CONVECTION SECTION

CROSS REFERENCE TO RELATED APPLICATION

The instant application is a national stage entry of PCT/US2022/012460, filed Jan. 14, 2022, which is a non-provisional of and claims the benefit of priority to U.S. Ser. No. 63/137,520, filed Jan. 14, 2021.

FIELD

The instant invention relates to methods and equipment for the processing of flue gas from fired heaters and the conditioning of reactants fed to the fired heaters.

BACKGROUND

Fired heaters are common elements of industrial plants, used in systems to provide process energy, for example, to indirectly heat process streams to suitable temperatures for chemical reactions, to generate steam, and to maintain high temperatures in plant utility streams. Examples of such units comprise reactors such as reformers, synthesis reactors, steam crackers, and other reactors. In general, a fired heater incorporates a radiant section housing one or more fuel burners in a firebox, dominated by radiant heat transfer to the process stream(s), and an adjacent convection section dominated by convective heat transfer to recover heat from a flue gas stream. Both sections may be internally insulated with refractory lining to protect a steel casing from flue gas temperatures, which may exceed 1260° C. (2300° F.).

The flue gas stream is created by burning a fuel stream with a combustion makeup gas such as oxygen, air, oxygen-enriched air, and the like, in the burners in the fired heater, and flows across one or more heat exchangers, e.g., heat recovery coils, sequentially disposed in a path of the flue gas before exiting to the atmosphere.

The key products of combustion are carbon dioxide and water. Condensate formed when flue gas drops below its dew point temperature is acidic and can damage internal components. For this reason, fired heaters are typically designed to avoid condensation, and as a result flue gas heat recovery may be limited. Other convection sections may comprise both a "hot" noncondensing section and a relatively cooler condensing section. The condensing section may require a chiller or refrigeration to provide a cooling fluid medium below ambient temperature to drive heat transfer.

Heat recovered from the convection section may also be used to preheat the feed to the reactors. There is an ongoing need in the industry to improve combustion and process efficiency by maximizing heat recovery so that less fuel is needed, and carbon dioxide emissions are reduced.

Incomplete combustion also produces carbon monoxide in the flue gas, and high temperatures in the radiant section may contribute to the formation of $NO_x$, i.e., nitrogen oxide (NO) and/or nitrogen dioxide ($NO_2$). Flue gases may also contain sulfur compounds and particulates. There is thus an ongoing need in the industry to reduce emissions of nitrogen oxides, sulfur compounds, and particulates, as well as greenhouse gases.

SUMMARY

The instant invention relates to a method and apparatus for improved efficiency and more effective flue gas scrubbing in a fired heater embodied in the use of unusually low flue gas temperatures and low temperature recovery of heat, preferably to vaporize water in a hydrocarbon stream. The present invention is embodied in a condensing convection section in a flow path of a flue gas from a fired heater in which the temperature of the flue gas is lowered, by heat exchange with a relatively colder process stream comprising a hydrocarbon or a mixture of water and hydrocarbon such as natural gas, to the dew point of the flue gas and condensate is formed. In embodiments, the condensate may be collected and recirculated to scrub the flue gas, e.g., by spraying the condensate into the flue gas, to improve removal of sulfur compounds, nitrogen oxides, particulates and the like.

In embodiments, very low-level heat can be recovered from the flue gas, e.g., below 70° C. (158° F.) or below 60° C. (140° F.), by employing an ambient temperature or cooled mixture of hydrocarbon and water. Saturation of a hydrocarbon vapor with water, for example, facilitates cooling of the flue gas while the heat removed provides the latent heat to vaporize the water in the process stream, e.g., without increasing the temperature of the process stream. The saturated process stream can then be optionally further heated, e.g., superheated, and fed to a reactor in a radiant section of the fired heater.

In one aspect, the invention is embodied in a method comprising: (a) heating a process fluid, comprising a hydrocarbon or preferably a mixture of hydrocarbon and water, in a first heat exchanger coil in a convection section of a fired heater, with a flue gas to cool the flue gas to below a dew point and form condensate; (b) collecting and removing the condensate from the convection section; (c) heating the process fluid from the first heat exchanger coil with the flue gas, in a second heat exchanger coil, upstream of the first heat exchanger coil with respect to flue gas flow through the convection section, to superheat and/or vaporize at least a portion of the process fluid; and (d) reacting the superheated and/or vaporized process fluid from the second heat exchanger in a radiant section of the fired heater.

In another aspect, the present invention is embodied in a fired heater comprising: (1) a radiant section to heat reaction tubes; (2) a convection section to receive flue gas from the radiant section; (3) a first heat exchanger coil in the convection section to heat a process fluid in the coil and cool the flue gas to a dew point, the process fluid comprising a hydrocarbon or preferably a mixture of the hydrocarbon and water; (4) a second heat exchanger coil in the convection section to cool the flue gas upstream of the first heat exchanger coil and vaporize at least a portion of the process fluid from the first heat exchanger; (5) a condensate recirculation system comprising: (5-a) a basin below the first heat exchanger coil to collect the condensate; and (5-b) a recycle line to recirculate the condensate from the basin to a distributor above the basin to contact and scrub the flue gas with the condensate; and (6) a process feed line to supply the process fluid from the second heat exchanger coil to the reaction tubes.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
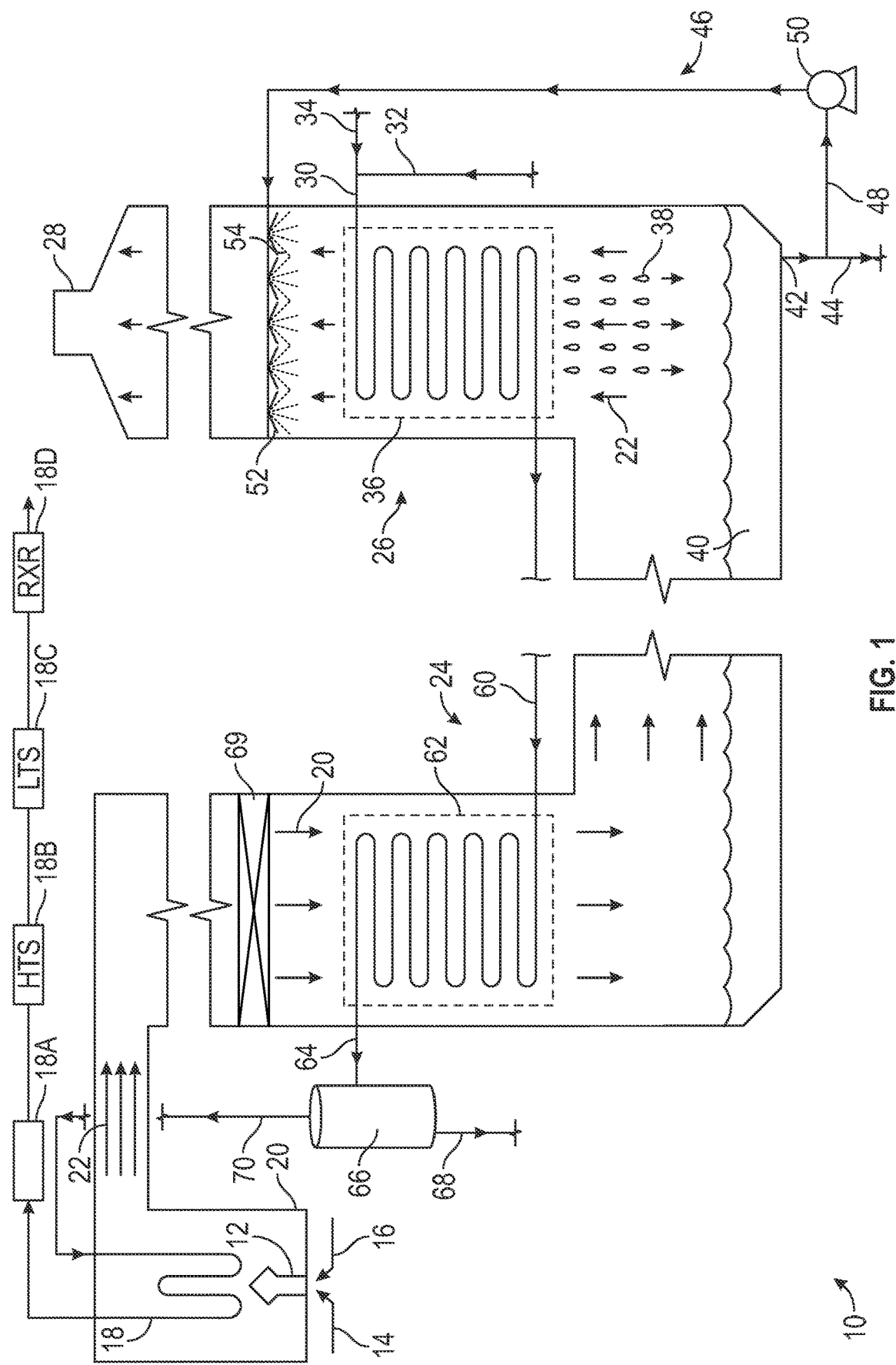
FIG. 1 is a block diagram illustrating a fired heater having a condensing convection section according to embodiments disclosed herein.

Descriptions and examples presented herein are solely for the purpose of illustrating preferred embodiments and should not be construed as limiting a scope of applications of this invention. While the methods and apparatus are described herein as using certain process approaches or design elements, their actual realization could optionally comprise two or more different process approaches or design elements. In addition, the process approaches and design elements can also comprise some components other than the ones cited.

Throughout the entire specification, including the claims, the following terms shall have the indicated meanings. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

For purposes herein, the term "and or" refers to the inclusive "and" case only, and such term is used herein for brevity. For example, a component comprising "A and or B" may comprise A alone, or both A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any process or apparatus described herein can be comprised of, can consist of, or can consist essentially of any one or more of the described elements. Moreover, steps in a process may be carried out in any order and are not limited to the order in which they are listed.

As used herein, "fired heater" refers to a furnace unit in which a fluid stream is heated by one or more fuel burners in a firebox, and includes where present, the flue gas treatment system up to discharge to the atmosphere. The mixture of effluent gases resulting from the combustion is referred to herein as the "flue gas." The heating may be effected by passing the fluid through tubes disposed in the firebox, which is dominated by radiant heat transfer and referred to herein as the "radiant section." Additional heat may be recovered from a section dominated by convection, i.e., the "convection section." Steam-methane reformers are used in the following discussion as one non-limiting example of a fired heater.

For purposes herein, the term "heat exchanger" refers to an indirect heat transfer unit in which one stream is put into thermal communication with another stream while maintaining physical separation between the streams. An "interchanger" refers to a heat exchanger in which a feed stream to a unit or stage is heated or cooled against an effluent stream from that unit or stage.

A "heat exchanger coil" refers to a tubular structure used in a heat exchanger to separate one stream passing through the tubular structure from another stream passing across an exterior surface of the tubular structure. The fluid flowing through the coil is referred to as the "coil fluid." A coil or heat exchanger may comprise one or more rows of one or more tubes or other conduits forming one or more pathways there-through to allow heat transfer between fluid flowing through the conduit and another fluid in thermal communication with the heat exchanger.

For purposes herein, "heat exchange relationship" means that a first material, stream, or unit receives heat directly or indirectly from a second material, stream, or unit.

A "condensing convection section" refers to a portion of the flue gas treatment system in which heat exchange results in at least partial condensation of the flue gas, i.e., the temperature is reduced to the dew point of the flue gas or below. A "non-condensing convection section" refers to a portion of the flue gas treatment system in which heat exchange does not result in condensation, i.e., the flue gas is maintained above its dew point.

For purposes herein, a "desulfurizer vessel" refers to a reactor, drum, column, or other enclosure in a sulfur removal system utilized to remove sulfur compounds from a process stream. Desulfurization is a well-known treatment process that removes sulfur by scrubbing with an alkali solid or solution, e.g., wet scrubbers using venturi-rod scrubbers, packed bed scrubbers, and/or spray towers, scrubbing with sodium sulfite solution, gas phase oxidation and ammonia reaction, or the like.

For purposes herein, "downstream" refers to a location in a fluid flow path spaced away from the reference location in the direction of flow, and "upstream" in the direction against flow. Unless otherwise stated herein, the terms "upstream" and "downstream" as applied to equipment or locations in the convection section are used in reference to the direction of the flue gas flow.

For purposes herein, processing, reacting, and/or treatment of material or process stream refers to any process that chemically or physically alters properties of a starting material. As used herein, a "process stream" refers to a stream comprising reactants, intermediates, and/or products used in a process. As used herein, "hydrocarbon" refers to any compound comprising carbon and hydrogen. As used herein, unless otherwise indicated or the context requires, "water" refers collectively to ice, liquid water, aqueous solutions and mixtures, water vapor, and/or steam. "Fluid" refers to gases, liquids, supercritical fluids, combinations thereof such as emulsions, foams, mists, and the like, and may also contain entrained solids.

For purposes herein, a "radiant section" refers to the hotter portion of a furnace wherein heat transfer is predominantly by radiation, as opposed to convection.

For purposes herein, a "reformer" refers to an apparatus, including a primary reformer and any pre-reformers and/or secondary reformers, in which a hydrocarbonaceous feedstock and steam are reformed to produce a synthesis gas. A "primary reformer" refers to a reformer which is heated primarily by oxidation, e.g., internally heated by partial oxidation as in an autothermal reformer or in a partial oxidation reformer, or by combustion, e.g., externally fired. A "secondary reformer" refers to a "post-reformer" in which the primary reformer effluent is subjected to further reforming. A "pre-reformer" refers to a reformer in which the feedstock is partially reformed prior to primary reforming.

For purposes herein, "shift conversion" means the step of passing a syngas mixture through a shift converter to react water and CO to produce CO2 and hydrogen. A "shift converter" is a physical reactor designed or intended to primarily promote the water-gas shift conversion reaction. The shift conversion can occur at high temperature, low temperature, or intermediate temperature.

A "superalloy," also known as a high-performance alloy, is a metallurgical alloy that exhibits several key characteristics: excellent mechanical strength, resistance to thermal creep deformation, good surface stability and resistance to corrosion or oxidation. The crystal structure is typically but not necessarily face-centered cubic austenitic.

For purposes herein, "selective catalytic reduction" or SCR refers to a means of converting nitrogen oxides, also referred to as NOx, with the aid of a catalyst into diatomic nitrogen (N2), and water (H2O). A reductant, typically anhydrous ammonia, aqueous ammonia or urea solution, is typically added to a stream of flue or exhaust gas and is absorbed onto the catalyst.

For purposes herein, a scrubbing agent refers to a material or combination of materials which have or impart removal of components upon contact of the material with a vapor stream, e.g., absorbents, reactants, and so on. Typical examples for aqueous scrubbing of flue gas components, e.g., $CO_2$, CO, NOx, $NO_2$, SOx, and the like, include ammonia, alkyl amines and alkanol amines having from 3 to 40 carbon atoms, sulfite, caustic soda, lithium hydroxide, calcium oxide (lime), urea, hydrogen peroxide, nitric acid, combinations thereof and the like.

For purposes herein, "synthesis gas" or "syngas" refers to a mixture of primarily hydrogen and carbon monoxide, e.g., from a reformer, but which may also comprise water and carbon dioxide.

In one aspect, the present invention is embodied in a method comprising: heating a process fluid comprising a hydrocarbon in a first heat exchanger coil in a convection section of a fired heater, with a flue gas to cool the flue gas to below a dew point and form condensate; collecting and removing the condensate from the convection section; heating the process fluid from the first heat exchanger coil with the flue gas, in a second heat exchanger coil, upstream of the first heat exchanger coil with respect to flue gas flow through the convection section, to superheat and/or vaporize at least a portion of the process fluid; and reacting the superheated and/or vaporized process fluid from the second heat exchanger in a radiant section of the fired heater. In embodiments, the method comprises flowing the flue gas from a radiant section through a non-condensing convection section, and then through a condensing convection section.

In various embodiments, the condensate can be collected within the condensing convection section, e.g., in a basin positioned below the first heat exchanger. In some embodiments the method may further comprise recycling a portion of the collected condensate to the convection section to contact and scrub the flue gas downstream of the first heat exchanger coil. The recycled condensate may be collected with the condensate from the first heat exchanger coil. In embodiments, the recycled condensate may be cooled prior to contact with the flue gas.

Also, a scrubbing agent may be added to the recycled condensate prior to contact with the flue gas, and if desired, all or a portion of the collected condensate can be regenerated to recover a carbon dioxide-rich stream and carbon dioxide-lean condensate for the recycling to the convection section. In some embodiments, the carbon dioxide from the carbon dioxide-rich stream can be reacted in a process stream in the radiant section, with the reaction products from the radiant section in a secondary process reactor, e.g., a secondary reformer, a shift converter (high and/or low temperature), or a combination thereof, to form a synthesis gas.

In embodiments, the method may further comprise passing the scrubbed flue gas through a demister to remove any entrained liquid.

In some embodiments, the method may further comprise combining the hydrocarbon with water to form the process fluid for the heating in the first heat exchanger coil, and optionally separating liquid from the process fluid from the second heat exchanger coil to form a liquid-lean vaporized process fluid for the reaction in the radiant section.

In some embodiments, the method may further comprise preheating the hydrocarbon in a third heat exchanger coil located downstream of the first heat exchanger in the convection section; further preheating the hydrocarbon from the third heat exchanger coil in a fourth heat exchanger coil upstream of the second heat exchanger coil in the convection section; and exchanging heat between the preheated hydrocarbon from the fourth heat exchanger coil and the preheated hydrocarbon from the third heat exchanger coil; and combining the hydrocarbon from the fourth heat exchanger coil with the water to form the process fluid for heating in the first heat exchanger coil. In these embodiments, the preheated hydrocarbon from the fourth heat exchanger coil may be desulfurized prior to the combination with the water, e.g., the third and fourth heat exchangers, as well as the interchanger, if present, may provide the heat required for the desulfurizing operation.

In some embodiments of the method, one of the first and second heat exchangers may be located in an essentially vertical convection flue section, and the other one of the first and second heat exchangers may be located in an essentially horizontal convection flue section. Preferably, the first heat exchanger is located in the essentially vertical convection flue section and the second heat exchanger in the essentially horizontal section.

In some embodiments, the method may further comprise splitting the flue gas downstream of the second heat exchanger coil into main and bypass flow portions, directing the main flow portion across the first heat exchanger coil, and recombining the main and bypass flow portions downstream of the first heat exchanger coil. The method may further comprise inducing a draft of the flue gas downstream of the second heat exchanger coil and upstream of the split and controlling relative proportions of the first and second flow portions using one or more flow dampers to regulate the flow of the second portion between the split and the recombination.

In some embodiments, the method may further comprise preheating air in an air preheat coil in the convection section and supplying the preheated air to a combustion burner in the radiant section.

In another aspect, the invention is embodied in a fired heater comprising: a radiant section to heat tubes; a convection section to receive flue gas from the radiant section; a first heat exchanger coil in the convection section to heat a process fluid in the coil and cool the flue gas to below a dew point, the process fluid comprising a mixture of hydrocarbon and water; a second heat exchanger coil in the convection section to cool the flue gas upstream of the first heat exchanger coil and superheat or vaporize at least a portion of the process fluid from the first heat exchanger; a condensate recirculation system comprising a basin below the first heat exchanger coil to collect the condensate, and a recycle line to recirculate the condensate from the basin to a distributor above the basin to contact and scrub the flue gas with the condensate; and a process feed line to supply the process fluid from the second heat exchanger coil to the radiant section tubes.

In some embodiments of the fired heater, the first heat exchanger coil comprises a plurality of tubes having a corrosion resistant material at least as a surface layer, and or the plurality of tubes consists essentially of the corrosion resistant material.

In some embodiments the fired heater further comprises a chiller to cool the recirculated condensate.

In embodiments, the recirculated condensate comprises a scrubbing agent; and or a regenerator to recover a carbon dioxide-rich stream from at least a portion of the collected condensate and form a carbon dioxide-lean condensate for the recirculation to the distributor. In embodiments, the fired heater may further comprise a carbon dioxide line to supply the recovered carbon dioxide-rich stream to the process feed line, to the reaction tubes, to a secondary process reactor receiving reaction products from the reaction tubes, or the like, or a combination thereof.

In some embodiments the fired heater further comprises a demister to remove entrained liquid from the flue gas downstream of the distributor.

In some embodiments the fired heater further comprises a separator vessel to separate liquid from the process fluid from the second heat exchanger coil.

In some embodiments the fired heater further comprises a third heat exchanger coil to heat the hydrocarbon downstream of the first heat exchanger coil in the convection section. The fired heater can optionally comprise: a first process line to supply the heated hydrocarbon from the third heat exchanger coil to a fourth heat exchanger coil upstream of the second heat exchanger coil in the convection section; a second process line to supply the heated hydrocarbon from the fourth heat exchanger coil to the process fluid heated in the first heat exchanger coil; and an interchanger to exchange heat between the hydrocarbon in the first and second lines. If desired, a desulfurizer vessel may be present to treat the heated hydrocarbon from the fourth heat exchanger coil and supply desulfurized hydrocarbon to the second process line.

In some embodiments the fired heater further comprises a split-stream flue downstream of the second heat exchanger coil to split the flue gas into main and bypass flow portions, a main split-stream flow path to direct the main flow portion across the first heat exchanger coil, and a bypass split-stream flow path to a ducting joint to recombine the main and bypass flow portions downstream of the first heat exchanger coil. An induced draft fan may be located downstream of the second heat exchanger coil and upstream of the split-stream flue, and one or more flow dampers may be located in the bypass split-stream flow path to regulate the flow of the second flow portion.

In some embodiments the fired heater further comprises an air preheat coil in the convection section, and a line to supply air from the air preheat coil to a combustion burner in the radiant section.

In various embodiments, the hydrocarbon present in the process fluid supplied to the first heat exchanger coil may comprise a gas phase, e.g., methane, ethane, propane, butane, pentane, and so on, depending on the composition, pressure and temperature of the process fluid. For the purposes of simplicity and clarity, the following discussion refers to the hydrocarbon as comprising chiefly (more than 50 volume percent) methane by way of example and not limitation.

The process fluid may also comprise carbon dioxide, water, oxygen, air, oxygen-enriched air, nitrogen, inert gases, etc. As those skilled in the art will appreciate, the process fluid supplied to the tubular reforming reactor is produced by combining water, typically steam, with the hydrocarbon, wherein the total amount of water added is sufficient to produce a steam-to-carbon molar ratio in the feed to the reactor from about 1:1 to about 5:1, preferably from about 2.5:1 to about 4:1, depending on the feed composition, operating conditions and parameters, and desired product(s). The total desired amount of water can be added to the process fluid after and/or preferably at least a portion before it is passed through the coil of the first heat exchanger.

In embodiments, the process fluid supplied to the first heat exchanger in the condensing convection section comprises the hydrocarbon and from about 1 weight percent to about 95 weight percent water, preferably from about 5 to about 90 weight percent based on the total weight of the process fluid, e.g., 5 to 99 weight percent hydrocarbon, preferably 10 to 95 weight percent hydrocarbon. For example, the water and hydrocarbon mixture supplied to the first heat exchanger can comprise from about 20 weight percent water, or from about 30 weight percent water, or from about 40 weight percent water, or from about 50 weight percent water, or from about 55 or 56 weight percent water, or from about 60 weight percent water, or from about 65 weight percent water, or from about 70 weight percent water, or from about 74, 75, or 76 weight percent water, up to about 87, 86, or 85 weight percent water, or up to about 84, 83, or 82 weight percent water, based on the total weight of the process fluid supplied to the first heat exchanger. E.g., where the hydrocarbon is methane (molecular weight about 16 per carbon), the mixture may comprise from about 54 weight percent water (steam:carbon ratio 1:1), or from about 74 weight percent water (steam:carbon ratio 2.5:1), up to about 85 weight percent water (steam:carbon ratio 5:1), or up to about 82 weight percent water (steam:carbon ratio 4:1), based on the total weight of the process fluid; or with another hydrocarbon having a molecular weight per carbon of about 14, from about 56 weight percent water (steam:carbon ratio 1:1) or from about 76 weight percent water (steam:carbon ratio 1:1), up to about 86 or 87 weight percent water (steam:carbon ratio 5:1) or up to about 76 weight percent water (steam:carbon ratio 4:1).

In some embodiments, the amount of water present in the feed to the first heat exchange is at least sufficient to maintain a constant temperature in the first heat exchange coil, e.g., a weight ratio of steam:carbon equal to the ratio of the partial pressure of water at the coil fluid temperature to the total pressure. In other embodiments, the amount of water present in the feed to the first heat exchanger is sufficiently low so as to obtain a single-phase gas mixture from the outlet of the first heat exchanger, and/or from the outlet of the second heat exchanger.

Where present in the coil fluid in the first heat exchanger, the water preferably comprises a liquid phase with the methane gas phase for two-phase flow to the first heat exchanger, preferably where the gas phase is undersaturated with respect to water. The liquid water may be present in an amount to maintain a generally constant temperature of the coil fluid as it passes through the first heat exchange coil, until the gas phase of the hydrocarbon reaches saturation. For example, the heat transferred to the process fluid can provide the latent heat to vaporize the water into the gas phase. When the gas phase is saturated, additional heating raises the dew point and continued vaporization slows the increase in temperature. If all the water is vaporized, then additional heating superheats the process stream.

For simplicity, the heat exchangers and other components are shown in the figures as being consecutively placed in the convection section of the flue. However, it is to be understood that additional components and/or other equipment and flow paths, e.g., selective catalytic reduction units, reactors, heat exchangers, and the like, may be placed upstream, in-between, and/or downstream of the components shown.

FIG. 1 is a block diagram in accordance with embodiments of the present invention illustrating a fired heater 10 having a burner 12 receiving fuel from line 14 and oxidant from line 16 to heat reactor tubes 18 in radiant section 20. Process effluent from the reactor tubes 18 may be subsequently processed in series or parallel in one or more reactors 18A, 18B, 18C, 18D, and so on, e.g., 18A may be a secondary reformer, 18B and 18C may be shift converters such as a high temperature shift converter and a low temperature shift converter, and 18D may be a methanol synthesis reactor, an ammonia synthesis reactor, an acetic acid synthesis reactor, a Fischer-Tropsch reactor, and so on, all of which are well known in the art. Flue gas 22 passes from the radiant section 20, through non-condensing convection section 24, condensing convection section 26, end exits from stack 28.

A process fluid stream 30, comprising hydrocarbon feed from line 32 and or water from line 34, flows through first heat exchanger 36, e.g., a condensing coil, in the condensing convection section 26 in heat exchange relationship with the flue gas 22 condensing on the outside surface of the condensing coil. As described above, process fluid stream 30 enters the first heat exchanger 36 at a temperature that may be below the dew point of the flue gas 22. When present, the relatively high heat capacity of water 34 in the process fluid 30 allows for improved removal of heat compared to using the hydrocarbon fluid 32 alone. In embodiments, the first heat exchanger 36 has sufficient surface area and contact with the flue gas 22 such that the temperature of the flue gas is reduced to its dew point or below. Condensate 38 which forms on the coil of the first heat exchanger 36, falls by gravity through the flue gas 22 flowing upwardly at a velocity less than the terminal velocity of the condensate droplets collected below in a collection zone, e.g., basin 40 located beneath the first heat exchanger 36.

In embodiments, the basin 40 comprises at least one take-off or drain 42, through which condensate 38 can be removed, e.g., via a condensate blowdown line 44 or the like. If desired, some or all of condensate 38 may be recycled back into contact with the flue gas 22 via condensate recycle loop 46 having a recycle line 48, pump 50, and distributor 52 located above and/or downstream from and/or in close proximity to the first heat exchanger 36, e.g., the distributor 52 may be located such that the recycled condensate impinges on or otherwise contacts the first heat exchanger 36, such as by locating spray nozzles 54 between rows of the condensing coils. In embodiments, the distributor 52 may be a spray bar comprising one or more spray nozzles 54 and/or other atomization devices, including, for example, gas assisted atomization devices, drip bars having one or more liquid outlets, and the like for contacting and further cooling and/or scrubbing flue gas 22, which then flows out through the stack 28.

Figure 2:
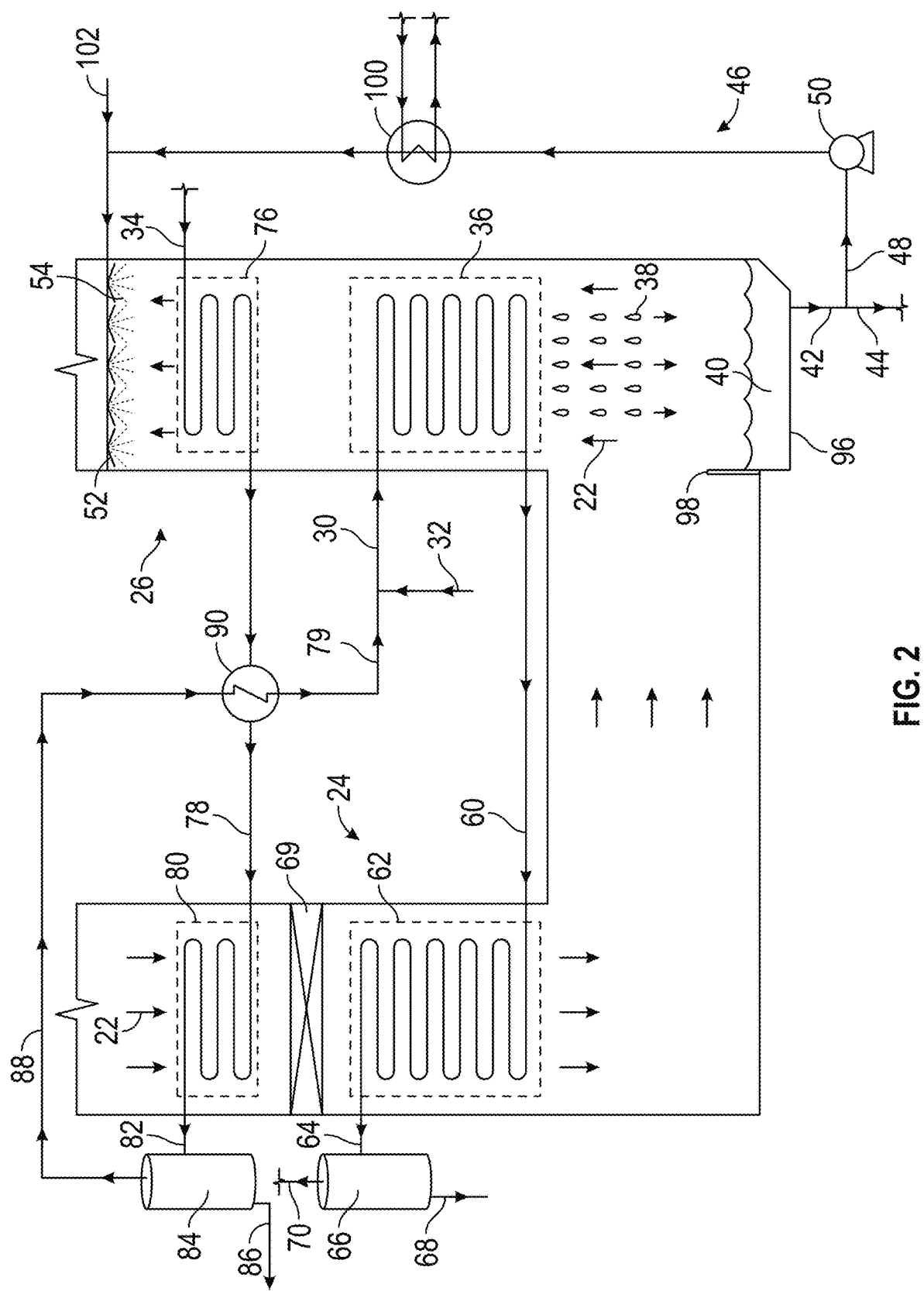
FIG. 2 is a block diagram illustrating feed gas desulfurization according to embodiments disclosed herein.

If desired, exposed surfaces in the condensing convection section 26, such as the walls and tubes of the heat exchangers, e.g., first heat exchanger 36 and third heat exchanger 76 (see. FIG. 2), may be coated and/or constructed of a corrosion-resistant material for protection from acidic flue gas or condensate and/or caustic scrubbing agents. In embodiments, one or more surfaces located in the condensing convection section 26 comprise at least a layer of corrosion resistant material, such as, for example, ceramics (titania, alumina, silica, etc.); nickel chrome, aluminum, tungsten, HASTELLOY® alloy, molybdenum, stainless steel, chromium carbide, bronze, brass, STELLITE® cobalt-chromium alloy, zinc, titanium, tantalum, metal nitrides, and other superalloys; polymer coatings such as xylan, fluorocarbons, fluoropolymers, silicones, epoxies, perfluoropolyethylene (e.g., TEFLON® industrial coating), DUPONT® FEP (fluorinated ethylene propylene), PFA (perfluoroalkoxy alkane), PTFE (polytetrafluoroethylene), HALAR® ECTFE (ethylene and chlorotrifluoroethylene), TEFZEL® ETFE (ethylene tetrafluoroethylene), nylon such as Nylon 11, or the like; or combinations. The exposed surfaces of these components may be coated or clad with the corrosion-resistant material and/or the components may be formed from (consist of or consist essentially of) the corrosion-resistant material. Various forging, casting, molding, drawing, stamping, machining, and other component fabrication technologies are available. Various coating technologies are also known to those skilled in the art, e.g., airless spraying, combustion wire process, electrostatic deposition, high velocity oxygen fuel, liquid dispersion, plasma, plural spray, powder metallizing, wire arc process, nanocoating, and the like.

As shown in FIG. 1, process fluid stream 60 flows from the first heat exchanger 36 and into second heat exchanger 62 in the upstream, non-condensing convection section 24 in heat exchange relationship to cool the flue gas 22. The heated, exiting process fluid stream 64 from the second heat exchanger 62 may then be further processed and/or supplied to the reactor tubes 18. In embodiments, process fluid stream 64 from the second heat exchanger 62 comprises hot vapor, e.g., hydrocarbon gas and superheated steam, or hydrocarbon gas and liquid and/or steam and water, and/or may, if desired, be directed into a saturator vessel 66, e.g., a saturator drum. The saturator vessel 66 may allow any separated solids and/or remaining liquid to exit via saturator blowdown 68, and the hydrocarbon gas and any other vapor phase components, such as steam, exit via vapor line 70 to the reactor tubes 18.

If desired, an SCR unit 69 can be disposed upstream from the second heat exchanger 62 to remove NOx contaminants. The temperature of flue gas 22 entering the SCR desirably ranges from about 288° C. (550° F.) to about 454° C. (850° F.), preferably from about 371° C. (700° F.) to about 399° C. (750° F.).

In another embodiment, FIG. 2 shows the FIG. 1 process with feed gas desulfurization and various condensate recirculation embodiments. Any or all of the features shown in FIG. 1 may be present in FIG. 2, and vice versa, although some components are omitted for enhanced clarity. In the embodiment of FIG. 2, the hydrocarbon process fluid stream 34 is first supplied to a third heat exchanger 76, e.g., a condensing preheat coil, which may be located in heat exchange relationship with the flue gas 22 in the condensing convection section 26, e.g., downstream of the first heat exchanger 36. If desired, the stream 34 may be available at a lower temperature than in FIG. 1, e.g., at ambient temperature or pre-chilled, and the use of the third heat exchanger 76 can allow the additional extraction of additional heat at relatively lower temperatures.

In embodiments, the exiting hydrocarbon fluid from the third heat exchanger 76 is then directed via line 78 into a fourth heat exchanger 80, which may be located in heat exchange relationship with the flue gas 22 in the non-condensing convection section 24, e.g., upstream of the second heat exchanger 62 and/or SCR unit 69. The hydrocarbon flowing from the fourth heat exchanger 80 in line 82 comprises vapor, and preferably consists of or consists essentially of vapor, i.e., is sufficiently free of solids and/or liquids to allow processing in the downstream treatment unit(s) 84, e.g., a desulfurizer unit. A sulfur-containing waste stream 86 may be discharged continuously or periodically from treatment unit 84. If desired, the hydrocarbon fluid stream 88 from the treatment unit 84 may be passed through the interchanger 90, in heat exchange relationship with the hydrocarbon in stream in line 78 for cooling and the cooled hydrocarbon stream in line 79 may then be combined with water via stream 32 as in FIG. 1 for supply to the first heat exchanger 36. In this manner, heat that may be required for any desulfurization and/or other treatment of the hydrocarbon feed stream is conveniently extracted from the non-condensing convection section 24.

FIG. 2 also shows additional and/or alternative embodiments for the condensate recirculation system 46. In these embodiments, the basin 40 may be of any suitable length, width, depth, and the like, located in a well or depression 96 that may be defined wholly or in part by a weir or dam 98. The system 46 may further include heat exchanger 100 to reduce the temperature of the recycled condensate in line 48 supplied to distributor 52, which may be positioned above the first and or third heat exchangers 36, 76 and/or in close proximity thereto.

In embodiments, the system 46 may further include scrubbing agent addition into the recycled condensate via line 102. In embodiments, the scrubbing agent may be added as a solution, e.g., an aqueous solution, preferably of an amine compound, i.e., R—NR$^1$R$^2$, wherein R is alkyl or alkanol having from 1 to 40 carbon atoms, preferably from 1 to 12 carbon atoms; and R$^1$ and R$^2$ are independently selected from hydrogen and alkyl or alkanol having from 1 to 40 carbon atoms, preferably from 1 to 12 carbon atoms. The preferred amine scrubbing agent is monoethanolamine; various other amines are known in the art to improve the sorptive scrubbing ability of condensate and other aqueous solutions.

Figure 3:
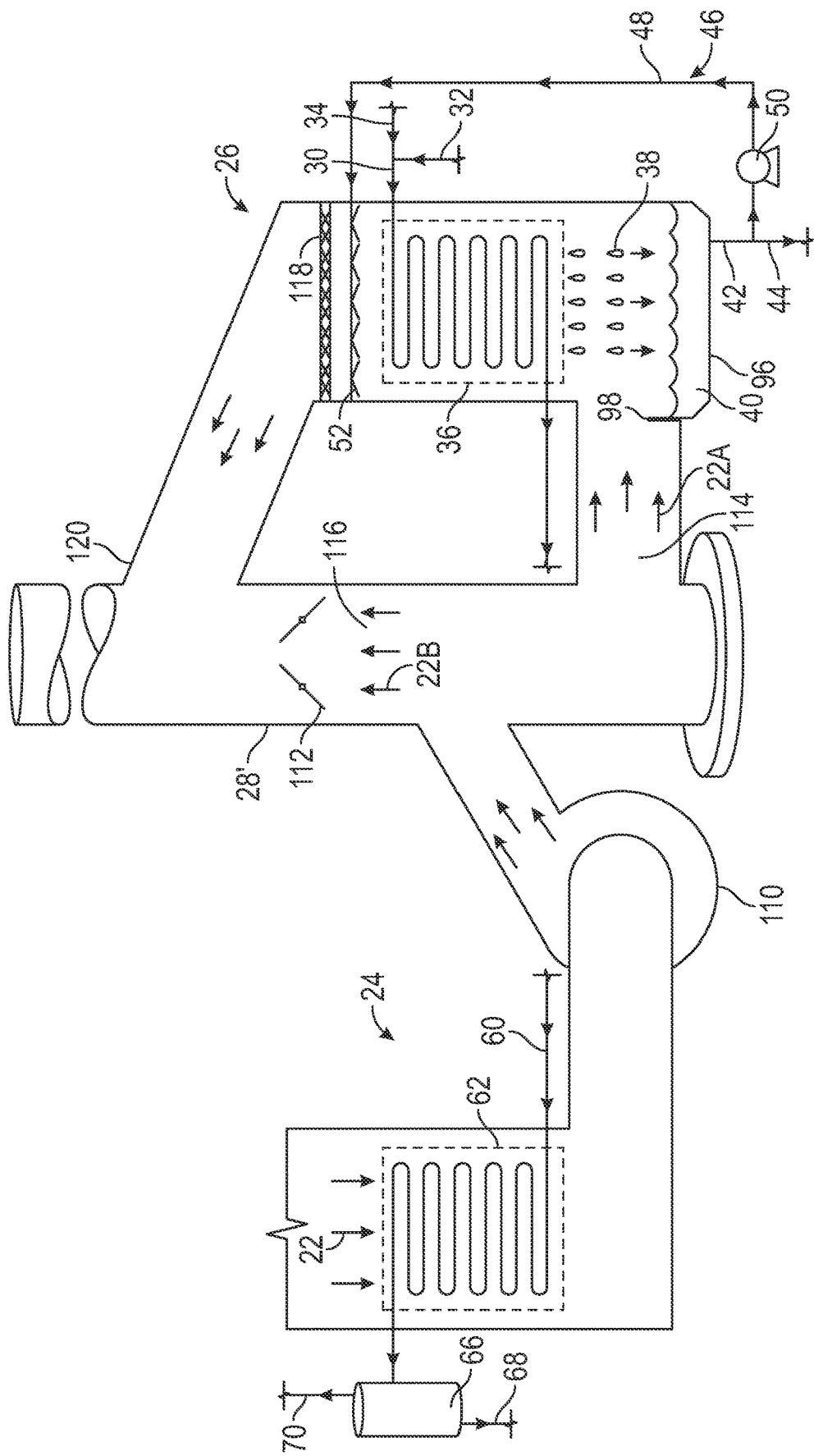
FIG. 3 is a block diagram illustrating flue gas bypass according to embodiments disclosed herein.

In another embodiment, FIG. 3 shows the process of FIGS. 1 and/or 2 with a split flue or flue gas bypass. Any or all of the features shown in FIGS. 1 and/or 2 may be present in FIG. 3, and vice versa, although some components are omitted for enhanced clarity. In the embodiment of FIG. 3, the hot flue gas 22 flows through the SCR unit 69 (see FIGS. 1-2), if present, across the second heat exchanger 62 disposed in the non-condensing convection section 24, and if needed, is drawn through induced draft fan 110 into stack 28'. One or more dampers 112 control the proportion of flue gas 22A flowing to main flow path 114 into the condensing convection section 26 to the first heat exchanger 36, and the proportion of flue gas 22B flowing directly out of the stack 28', bypassing the condensing convection section 26 via bypass flow path 116. The flue gas 22A flows through the first heat exchanger 36, distributor 52, and demister 118, and then reenters the stack 28' at the ducting joint 120 above the dampers 112, where it is recombined with the flue gas 22B for discharge. This embodiment allows bypassing the condensing section 26, allowing relatively higher flue gas temperature operation, whether expected or unexpected, and can be used to prevent damage to corrosion resistant materials or coatings. For example, in the event of a process excursion due to a loss of cooling fluid to the condensing section 26, flue gas temperature could rise to a point which damages equipment, e.g., polymer protective coatings may melt. By controlling the bypass flow with dampers 112, this damage may be avoided.

As shown in FIG. 3, the demister 118 may be located downstream of the first heat exchanger 36 and or distributor 52 to inhibit condensate entrainment to the stack 28'.

Figure 4:
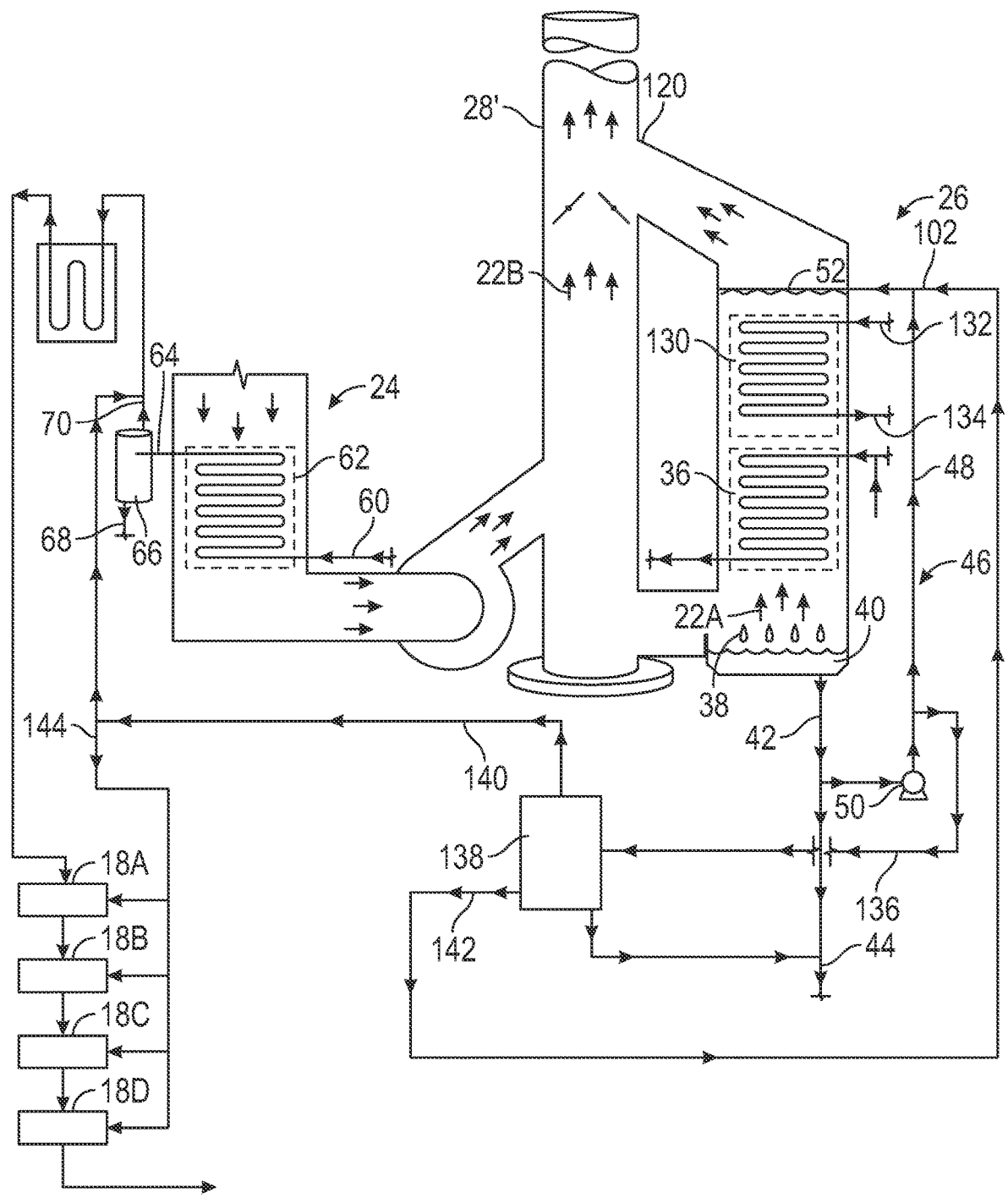
FIG. 4 is a block diagram illustrating a regenerative scrubbing system in a condensing convection section according to embodiments disclosed herein.

In another embodiment, FIG. 4 shows the process of FIGS. 1, 2, and/or 3 with an additional heat exchanger in the convection section and scrubbing agent regeneration. Any or all of the features shown in FIGS. 1, 2, and/or 3 may be present in FIG. 4, and vice versa, although some components are omitted for enhanced clarity. In the embodiment of FIG. 4, an additional heat exchanger(s) 130, which may the third heat exchanger 76 (FIG. 2) and/or another heat exchanger in lieu of or in addition to third heat exchanger 76, is located in the condensing convection section 26, e.g., downstream of first heat exchanger 36 and/or upstream of distributor 52. The cooling fluid 132 supplied to the heat exchanger 130 may be air which is preheated and recovered in line 134, e.g., before being supplied as combustion air for the burners 12 via line 16 (see FIG. 1). In other embodiments, the fluid 132 may be used to transfer heat to and from other parts of the process associated with the fired heater 10 (FIG. 1), or to or from another process.

In FIG. 4, the scrubbing agent 102 may comprise an amine solution as discussed above to improve scrubbing of carbon dioxide ($CO_2$) from the flue gas 22A. In embodiments, at least a portion of the condensate/scrubbing solution from line 42 is directed via line 136 to regenerator 138 where it is treated to remove $CO_2$, according to principles well known in the art, recovering a carbon-dioxide-rich stream 140, and a regenerated, aqueous carbon dioxide-lean stream 142. The scrubbing agent in the regenerated stream 142 may then be supplied to the recycled condensate via line 102. Blowdown from the regenerator may be supplied to line 44 for appropriate treatment. In embodiments, the carbon-dioxide-rich stream 140 recovered from scrubbing the flue gas may be directed into the reactor tubes 18 (see FIG. 1) via line 70 with the vapor from saturator 66, or additionally and/or alternatively, the carbon-dioxide-rich stream 140 may be directed via line 144 into one of the other process reactors, e.g., secondary reformer 18A, high temperature shift converter 18B, low temperature shift converter 18C, methanol or ammonia reactor 18D. For example, the carbon dioxide may be directed as a reactant into reactor 18D when it is employed in a methanol production system, thereby reducing CO 2 emissions while increasing production capacity.

Figure 5:
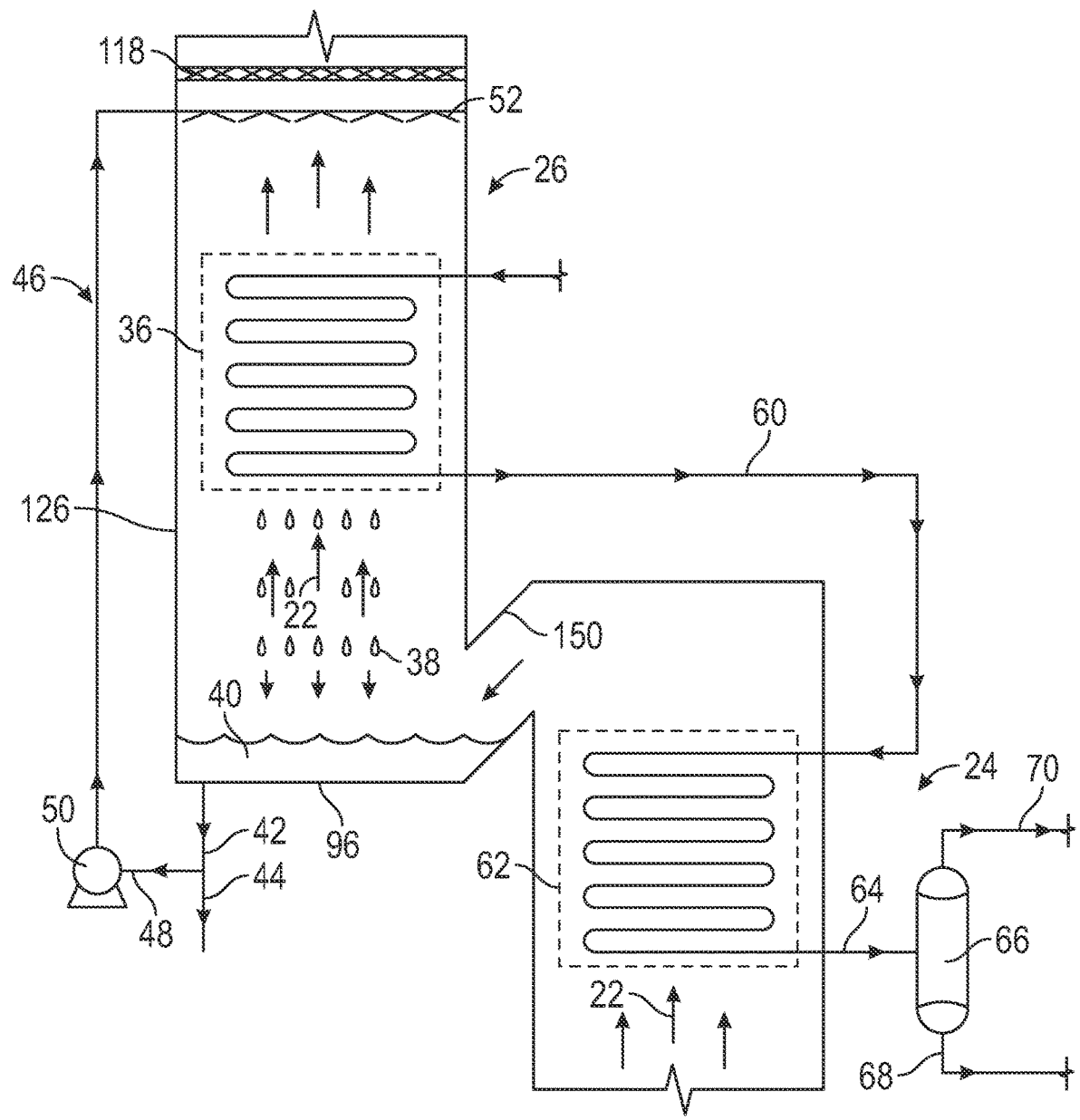
FIG. 5 is a block diagram illustrating an upflow convection section according to embodiments disclosed herein.

In another embodiment, FIG. 5 shows the process of FIGS. 1, 2, 3, and/or 4 with upflow vertical non-condensing and condensing convection sections. Any or all of the features shown in FIGS. 1, 2, 3, and/or 4 may be present in FIG. 5, and vice versa, although some components are omitted for enhanced clarity. In the embodiment of FIG. 5, both of the condensing convection section 26 and the noncondensing convection section 24 are generally vertical with relatively minor horizontal flue gas flow. A variety of fired heaters have designs using a noncondensing convection section 24 generally configured in a vertical orientation. Examples where the noncondensing convection section 24 is desirably vertical include various steam methane reformers, steam crackers, and the like.

In FIG. 5, the flue gas 22 flows upwardly through the second heat exchanger 62, and then flows slightly downwardly through offset 150, which provides downwardly sloped walls for any condensate to drain by gravity into the basin 40 in well 96 and inhibits the condensate 38 from falling into the noncondensing convection section 24. The flue gas 22 then flows upwardly through the first heat exchanger 36 and recirculation loop 46 returns the condensate to distributor 52, as described above in any of FIGS. 1-4.

Figure 6:
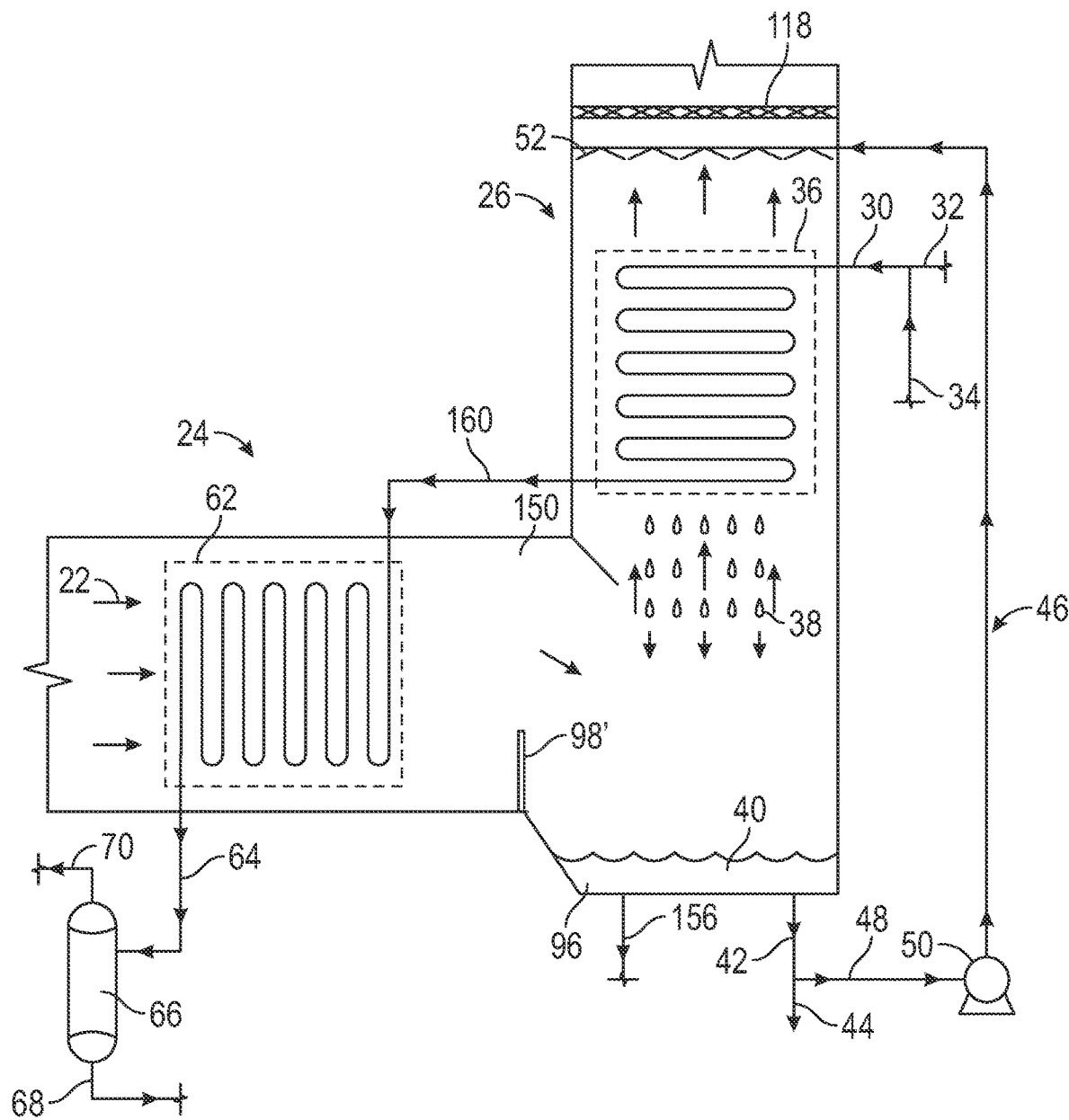
FIG. 6 is a block diagram illustrating a scrubbing system with both horizontal and vertical heat exchange zones in a convection section according to embodiments disclosed herein.

In another embodiment, FIG. 6 shows the process of FIGS. 1, 2, 3, and/or 4 with a horizontal non-condensing section 24 and a vertical condensing convection section 26. Any or all of the features shown in FIGS. 1, 2, 3, and/or 4 may be present in FIG. 6, and vice versa, although some components are omitted for enhanced clarity. In the embodiment of FIG. 6, the noncondensing convection section 24 is generally horizontal, and condensing convection section 26 is generally vertical. Fired heaters may have designs using a noncondensing convection section 24 generally configured in a horizontal orientation.

In FIG. 6, the flue gas 22 flows generally horizontally through the second heat exchanger 62, and then flows slightly downwardly through offset 150, which provides downwardly sloped walls for any condensate to drain by gravity into the basin 40 in well 96 and inhibits the condensate 38 from falling into or otherwise entering the noncondensing convection section 24. The offset 150 may also include at its entry a dam 98' that is sufficiently high to increase the velocity of the flue gas 22 and further inhibit entry of the condensate into the noncondensing convection section 24. The flue gas 22 then flows upwardly through the first heat exchanger 36 and recirculation loop 46 returns the condensate to distributor 52, as described above in any of FIGS. 1-4. If desired, the basin 40 may be equipped with drain 156 that may be separate from drain 44 in recirculation system 46, e.g., to provide another way of removing condensate in the event there is an unexpected accumulation in the basin 40 that might overflow the dam 98'.

EMBODIMENTS LISTING

Accordingly, in some aspects the disclosure herein relates generally to methods and apparatus for improved fired heaters according to the following embodiments, among others:

1. A method comprising:
    heating a process fluid, comprising a hydrocarbon, in a first heat exchanger coil in a convection section of a fired heater, with a flue gas to cool the flue gas to below a dew point and form condensate;
    collecting and removing the condensate from the convection section;
    heating the process fluid from the first heat exchanger coil with the flue gas, in a second heat exchanger coil, upstream of the first heat exchanger coil with respect to flue gas flow through the convection section, to superheat and/or vaporize at least a portion of the process fluid; and
    reacting the superheated and/or vaporized process fluid from the second heat exchanger in a radiant section of the fired heater.

2. The method of embodiment 1, further comprising recycling a portion of the collected condensate to the convection section to contact and scrub the flue gas downstream of the first heat exchanger coil.

3. The method of embodiment 2, comprising collecting the recycled condensate with the condensate from the first heat exchanger coil.

4. The method of embodiment 3, further comprising cooling the recycled condensate prior to contact with the flue gas.

5. The method of embodiment 3 or embodiment 4, further comprising adding a scrubbing agent to the recycled condensate prior to contact with the flue gas.

6. The method of embodiment 5, further comprising regenerating at least a portion of the collected condensate to recover a carbon dioxide-rich stream and carbon dioxide-lean condensate for the recycling to the convection section.

7. The method of embodiment 6, further comprising reacting carbon dioxide from the carbon dioxide-rich stream in the radiant section, with reaction products from the radiant section in a secondary process reactor, or a combination thereof, to form a synthesis gas.

8. The method of any of embodiments 3 to 7, further comprising passing the scrubbed flue gas through a demister to remove entrained liquid.

9. The method of any preceding embodiment, further comprising combining the hydrocarbon with water to form the process fluid for the heating in the first heat exchanger coil.

10. The method of embodiment 9, further comprising separating liquid from the process fluid from the second heat exchanger coil to form a liquid-lean vaporized process fluid for the reaction in the radiant section.

11. The method of embodiment 9 or embodiment 10, further comprising:
preheating the hydrocarbon in a third heat exchanger coil located downstream of the first heat exchanger in the convection section;
further preheating the hydrocarbon from the third heat exchanger coil in a fourth heat exchanger coil upstream of the second heat exchanger coil in the convection section; and
exchanging heat between the preheated hydrocarbon from the fourth heat exchanger coil and the preheated hydrocarbon from the third heat exchanger coil; and
combining the hydrocarbon from the fourth heat exchanger coil with the water to form the process fluid for heating in the first heat exchanger coil.

12. The method of embodiment 11, further comprising desulfurizing the preheated hydrocarbon from the fourth heat exchanger coil prior to the combination with the water.

13. The method of any of embodiments 1 to 8 or 9 to 12, wherein one of the first and second heat exchangers is located in an essentially vertical convection flue section, and the other one of the first and second heat exchangers is located in an essentially horizontal convection flue section, preferably wherein the first heat exchanger is located in the essentially vertical convection flue section and the second heat exchanger is located in the essentially horizontal convection flue section.

14. The method of any of embodiments 1 to 8, 9 to 12, or 13, further comprising inducing a draft of the flue gas downstream of the second heat exchanger coil and upstream of the condensate collection and first heat exchanger coil and discharging the flue gas downstream from the first heat exchanger into a stack.

15. The method of embodiment 14, further comprising diverting at least a portion of the flue gas, from a location that is downstream of the draft induction and upstream of the condensate collection and first heat exchanger coil, through a bypass into the stack bypassing the condensate collection and first heat exchanger coil.

16. The method of embodiment 15, further comprising controlling the portion of the diverted flue gas using one or more flow dampers to regulate the flow of the diverted portion, preferably to control a temperature of the first heat exchanger.

17. The method of embodiment 16, further comprising passing the flue gas downstream of the draft induction across the first heat exchanger coil and into the stack located above the first heat exchanger, wherein at least one of the one or more dampers is located in the bypass.

18. The method of any of embodiments 1 to 17, further comprising preheating air in an air preheat coil in the convection section and supplying the preheated air to a combustion burner in the radiant section.

19. A fired heater comprising:
a radiant section to heat tubes;
a convection section to receive flue gas from the radiant section;
a first heat exchanger coil in the convection section to heat a process fluid in the coil and cool the flue gas to below a dew point, the process fluid comprising a mixture of hydrocarbon and water;
a second heat exchanger coil in the convection section to cool the flue gas upstream of the first heat exchanger coil and superheat or vaporize at least a portion of the process fluid from the first heat exchanger;
a condensate recirculation system comprising:
a basin below the first heat exchanger coil to collect the condensate; and
a recycle line to recirculate the condensate from the basin to a distributor above the basin to contact and scrub the flue gas with the condensate; and
a process feed line to supply the process fluid from the second heat exchanger coil to the radiant section tubes.

20. The fired heater of embodiment 19, wherein the first heat exchanger coil comprises a plurality of tubes having a corrosion resistant material at least as a surface layer.

21. The fired heater of embodiment 20, wherein the plurality of tubes consists essentially of the corrosion resistant material.

22. The fired heater of any of embodiments 19 to 21, further comprising a chiller to cool the recirculated condensate.

23. The fired heater of any of embodiments 19 to 22, wherein the recirculated condensate comprises a scrubbing agent.

24. The fired heater of embodiment 23, further comprising a regenerator to recover a carbon dioxide-rich stream from at least a portion of the collected condensate and form a carbon dioxide-lean condensate for the recirculation to the distributor.

25. The fired heater of embodiment 24, further comprising a carbon dioxide line to supply the recovered carbon dioxide-rich stream to the process feed line, to the reaction tubes, to a secondary process reactor receiving reaction products from the reaction tubes, or a combination thereof.

26. The fired heater of any of embodiments 19 to 25, further comprising a demister to remove entrained liquid from the flue gas downstream of the distributor.

27. The fired heater of any of embodiments 19 to 26, further comprising a separator vessel to separate liquid from the process fluid from the second heat exchanger coil.

28. The fired heater of any of embodiments 19 to 26 or 27, further comprising a third heat exchanger coil to heat the hydrocarbon downstream of the first heat exchanger coil in the convection section.

29. The fired heater of embodiment 28, further comprising:
a first process line to supply the heated hydrocarbon from the third heat exchanger coil to a fourth heat exchanger coil upstream of the second heat exchanger coil in the convection section;
a second process line to supply the heated hydrocarbon from the fourth heat exchanger coil to the process fluid heated in the first heat exchanger coil; and
an interchanger to exchange heat between the hydrocarbon in the first and second lines.

30. The fired heater of embodiment 29, further comprising a desulfurizer vessel to treat the heated hydrocarbon from the fourth heat exchanger coil and supply desulfurized hydrocarbon to the second process line.

31. The fired heater of any of embodiments 19 to 30, further comprising a split-stream flue downstream of the second heat exchanger coil to split the flue gas into main and bypass flow portions, a main split-stream flow path to direct the main flow portion across the first heat exchanger coil, and a bypass split-stream flow path to a ducting joint to recombine the main and bypass flow portions downstream of the first heat exchanger coil.

32. The fired heater of embodiment 31, further comprising an induced draft fan downstream of the second heat exchanger coil and upstream of the split-stream flue, and one or more flow dampers in the bypass split-stream flow path to regulate the flow of the bypass flow portion.

33. The fired heater of any of embodiments 19 to 32, further comprising an air preheat coil in the convection section, and a line to supply air from the air preheat coil to a combustion burner in the radiant section.

EXAMPLES

Embodiments of the invention are illustrated by the following examples.

Example 1: Condensing convection section cooled by hydrocarbon and or hydrocarbon/water mixture; feed gas saturation; recirculated condensate.

Example 2: Preheat and desulfurization of feed hydrocarbon with interchanger; condensing convection section cooled by hydrocarbon/water mixture; feed gas saturation; recirculated condensate with regeneration and chilling.

Example 3: split flue with scrubbing bypass.

Example 4: Condensing convection section cooled by hydrocarbon and or hydrocarbon/water mixture; feed gas saturation; recirculated condensate; split flue with scrubbing bypass.

Example 5: Preheat and desulfurization of feed hydrocarbon with interchanger; condensing convection section cooled by hydrocarbon/water mixture; feed gas saturation; recirculated condensate with regeneration and chilling; split flue with scrubbing bypass.

Example 6: Condensing convection section cooled by hydrocarbon and or hydrocarbon/water mixture; feed gas saturation; recirculated condensate; preheat and desulfurization of feed hydrocarbon with interchanger; recirculated condensate with regeneration and chilling; split flue with scrubbing bypass.

Although only a few exemplary embodiments have been described in detail above, those skilled in the art will readily appreciate that many modifications are possible in the example embodiments without materially departing from this disclosure. For example, any embodiments specifically described may be used in any combination or permutation with any other specific embodiments described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' or 'step for' together with an associated function without the recitation of structure.

We claim:

1. A method comprising:
heating a process fluid, comprising a hydrocarbon, in a first heat exchanger coil in a convection section of a fired heater, with a flue gas to cool the flue gas to below a dew point and form condensate;
collecting and removing the condensate from the convection section;
heating the process fluid from the first heat exchanger coil with the flue gas, in a second heat exchanger coil, upstream of the first heat exchanger coil with respect to flue gas flow through the convection section, to superheat and/or vaporize at least a portion of the process fluid; and
reacting the superheated and/or vaporized portion of the process fluid from the second heat exchanger in a radiant section of the fired heater.

2. The method of claim 1, further comprising recycling a portion of the collected condensate to the convection section to contact and scrub the flue gas downstream of the first heat exchanger coil.

3. The method of claim 2, comprising collecting the recycled portion of the condensate with the condensate from the first heat exchanger coil.

4. The method of claim 3, further comprising cooling the recycled portion of the condensate prior to contact with the flue gas.

5. The method of claim 4, further comprising adding a scrubbing agent to the recycled portion of the condensate prior to contact with the flue gas.

6. The method of claim 5, further comprising regenerating at least a portion of the collected condensate to recover a carbon dioxide-rich stream and carbon dioxide-lean condensate for the recycling to the convection section.

7. The method of claim 6, further comprising reacting carbon dioxide from the carbon dioxide-rich stream in the radiant section, with reaction products from the radiant section in a secondary process reactor, or a combination thereof, to form a synthesis gas.

8. The method of claim 2, further comprising passing the scrubbed flue gas through a demister to remove entrained liquid.

9. The method of claim 2, further comprising combining the hydrocarbon (34, 79) with water (32) to form the process fluid (30) for the heating in the first heat exchanger coil.

10. The method of claim 9, further comprising separating liquid from the process fluid from the second heat exchanger coil to form a liquid-lean vaporized process fluid for the reaction in the radiant section.

11. The method of claim 10, further comprising:
preheating the hydrocarbon in a third heat exchanger coil located downstream of the first heat exchanger in the convection section;
further preheating the hydrocarbon from the third heat exchanger coil in a fourth heat exchanger coil upstream of the second heat exchanger coil in the convection section; and
exchanging heat between the preheated hydrocarbon from the fourth heat exchanger coil and the preheated hydrocarbon from the third heat exchanger coil; and
combining the hydrocarbon (79) from the fourth heat exchanger coil (80) with the water (32) to form the process fluid (30) for heating in the first heat exchanger coil (36).

12. The method of claim 11, further comprising desulfurizing (84) the preheated hydrocarbon (82) from the fourth heat exchanger coil (62) prior to the combining of the hydrocarbon (79) with the water (32).

13. The method of claim 1, wherein the first heat exchanger coil is located in an essentially vertical convection flue section, and the second heat exchanger coil is located in an essentially horizontal convection flue section.

14. The method of claim 1, further comprising inducing a draft of the flue gas downstream of the second heat exchanger coil and upstream of the condensate collection and first heat exchanger coil and discharging the flue gas downstream from the first heat exchanger into a stack.

15. The method of claim 14, further comprising diverting at least a portion of the flue gas, from a location that is downstream of the draft induction and upstream of the condensate collection and first heat exchanger coil, through a bypass into the stack bypassing the condensate collection and first heat exchanger coil.

16. The method of claim 15, further comprising controlling the portion of the diverted flue gas using one or more flow dampers to regulate the flow of the diverted portion to control a temperature of the first heat exchanger coil.

17. The method of claim 16, further comprising passing the flue gas downstream of the draft induction across the first heat exchanger coil and into the stack located above the first heat exchanger coil, wherein at least one of the one or more dampers is located in the bypass.

18. The method of claim 1, further comprising preheating air in an air preheat coil in the convection section and supplying the preheated air to a combustion burner in the radiant section.

19. A fired heater comprising:
a radiant section to heat tubes in the radiant section;
a convection section to receive flue gas from the radiant section;
a first heat exchanger coil in the convection section to heat a process fluid in the coil and cool the flue gas to below a dew point and form condensate, wherein the process fluid comprises a mixture of hydrocarbon and water;
a second heat exchanger coil in the convection section to cool the flue gas upstream of the first heat exchanger coil and superheat or vaporize at least a portion of the process fluid from the first heat exchanger coil; and
a condensate recirculation system comprising:
a basin below the first heat exchanger coil to collect the condensate;
a recycle line to recirculate the condensate from the basin to a distributor above the basin to contact and scrub the flue gas with the condensate; and
a process feed line to supply the process fluid from the second heat exchanger coil to the tubes in the radiant section.

20. The fired heater of claim 19, wherein the first heat exchanger coil comprises a plurality of tubes having a corrosion resistant material at least as a surface layer.

21. The fired heater of claim 19, further comprising:
a chiller to cool the recirculated condensate;
a demister to remove entrained liquid from the flue gas downstream of the distributor;
an air preheat coil in the convection section; and
a line to supply air from the air preheat coil to a combustion burner in the radiant section.

22. The fired heater of claim 21, wherein the recirculated condensate comprises a scrubbing agent and further comprising:
a regenerator to recover a carbon dioxide-rich stream from at least a portion of the collected condensate and form a carbon dioxide-lean condensate for the recirculation to the distributor; and
a carbon dioxide line to supply the recovered carbon dioxide-rich stream to the process feed line, to the reaction tubes, to a secondary process reactor receiving reaction products from the reaction tubes, or a combination thereof.

23. The fired heater of claim 19, further comprising a separator vessel to separate liquid from the process fluid from the second heat exchanger coil.

24. The fired heater of claim 19, further comprising:
a third heat exchanger coil to heat the hydrocarbon downstream of the first heat exchanger coil in the convection section;
a first process line to supply the heated hydrocarbon from the third heat exchanger coil to a fourth heat exchanger coil upstream of the second heat exchanger coil in the convection section;
a second process line to supply the heated hydrocarbon from the fourth heat exchanger coil to the process fluid heated in the first heat exchanger coil; and
an interchanger to exchange heat between the hydrocarbon in the first and second process lines.

25. The fired heater of claim 24, further comprising a desulfurizer vessel to treat the heated hydrocarbon from the fourth heat exchanger coil and supply desulfurized hydrocarbon to the second process line.

26. The fired heater of claim 19, further comprising a split-stream flue downstream of the second heat exchanger coil to split the flue gas into main and bypass flow portions, a main split-stream flow path to direct the main flow portion across the first heat exchanger coil, and a bypass split-stream flow path to a ducting joint to recombine the main and bypass flow portions downstream of the first heat exchanger coil.

27. The fired heater of claim 26, further comprising an induced draft fan downstream of the second heat exchanger coil and upstream of the split-stream flue, and one or more flow dampers in the bypass split-stream flow path to regulate the flow of the bypass flow portion.

* * * * *